United States Patent
Paine, III et al.

(10) Patent No.: US 7,997,282 B2
(45) Date of Patent: *Aug. 16, 2011

(54) CIGARETTE FILTER WITH BEADED CARBON

(75) Inventors: John B. Paine, III, Midlothian, VA (US); Zuyin Yang, Midlothian, VA (US); Kent B. Koller, Chesterfield, VA (US); Jay A. Fournier, Richmond, VA (US); Charles E. Thomas, Jr., Richmond, VA (US); Timothy S. Sherwood, Midlothian, VA (US); Zhaohua Luan, Midlothian, VA (US); Shuzhong Zhuang, Richmond, VA (US); Jose G. Nepomuceno, Beaverdam, VA (US); Diane L. Gee, Richmond, VA (US); Georgios D. Karles, Richmond, VA (US)

(73) Assignee: Philip Morris USA Inc., Richmond, VA (US)

( * ) Notice: Subject to any disclaimer, the term of this patent is extended or adjusted under 35 U.S.C. 154(b) by 557 days.

This patent is subject to a terminal disclaimer.

(21) Appl. No.: 11/931,624

(22) Filed: Oct. 31, 2007

(65) Prior Publication Data

US 2008/0053469 A1    Mar. 6, 2008

Related U.S. Application Data

(63) Continuation of application No. 10/339,680, filed on Jan. 9, 2003, now Pat. No. 7,784,470.

(60) Provisional application No. 60/347,558, filed on Jan. 9, 2002, provisional application No. 60/403,490, filed on Aug. 14, 2002.

(51) Int. Cl.
*A24D 3/04* (2006.01)

(52) U.S. Cl. ........ 131/344; 131/335; 131/341; 131/342; 131/345

(58) Field of Classification Search .................. None
See application file for complete search history.

(56) References Cited

U.S. PATENT DOCUMENTS 2,881,770 A    4/1959    Touey et al.
(Continued)

FOREIGN PATENT DOCUMENTS

EP    0 579 410 B1    2/1975
(Continued)

OTHER PUBLICATIONS

Witco Chemical Corporation, "Witcarb activated carbon: Activated carbon for gas-phase service, Bulletin W-117A", Nov. 1978. Accesed via Legacy Tobacco Documents Library, Bates record No. 505006941/6944, http://legacy.library.uscf.edu/tid/say56a00, accessed Sep. 20, 2009.*

(Continued)

*Primary Examiner* — Richard Crispino
*Assistant Examiner* — Michael J Felton
(74) *Attorney, Agent, or Firm* — Connolly Bove Lodge & Hutz LLP

(57) ABSTRACT

A smoking article such as a cigarette comprises a tobacco rod and a filter component having a cavity filled with spherical beaded carbon. As mainstream tobacco smoke is drawn through the filter component, targeted gas phase smoke constituents are removed as the smoke passes through the carbon. During the filter manufacturing process the spherical beaded carbon flows like a liquid and substantially completely fills the cavity. Point-to-point contact between the spherical beads together with substantially complete filling of the cavity produces minimal channeling of ambulatory gas phase as well as maximum contact between the gas phase and the carbon surface of the spherical beads during smoking.

14 Claims, 5 Drawing Sheets

U.S. PATENT DOCUMENTS

| | | | |
|---|---|---|---|
| 3,101,723 | A | 8/1963 | Seligman et al. |
| 3,150,668 | A | 9/1964 | Lassiter et al. |
| 3,279,476 | A | 10/1966 | Noznick et al. |
| 3,351,071 | A * | 11/1967 | Belfort ............... 131/342 |
| 3,353,543 | A | 11/1967 | Sproull et al. |
| 3,368,566 | A | 2/1968 | Avedikian |
| 3,409,020 | A | 11/1968 | Westbrook, Jr. et al. |
| 3,621,851 | A | 11/1971 | Heskett et al. |
| 3,648,711 | A | 3/1972 | Berger et al. |
| 3,849,545 | A | 7/1975 | Crellin et al. |
| 3,909,449 | A | 9/1975 | Nagai et al. |
| 3,972,225 | A | 8/1976 | Fort et al. |
| 3,972,335 | A | 8/1976 | Tiggelbeck et al. |
| 4,045,368 | A | 8/1977 | Katori et al. |
| 4,201,234 | A * | 5/1980 | Neukomm ............ 131/342 |
| 4,214,508 | A | 7/1980 | Washington |
| 4,281,671 | A | 8/1981 | Bynre et al. |
| 4,481,958 | A | 11/1984 | Rainer et al. |
| 4,532,943 | A | 8/1985 | Nichols et al. |
| 4,917,835 | A | 4/1990 | Lear et al. |
| 4,957,897 | A | 9/1990 | Maroldo et al. |
| 5,221,247 | A | 6/1993 | Budjinski, II et al. |
| 5,263,999 | A | 11/1993 | Baldwin et al. |
| 5,322,459 | A | 6/1994 | Spinnato |
| 5,404,890 | A | 4/1995 | Gentry et al. |
| 5,423,336 | A | 6/1995 | Mentzel et al. |
| 5,443,560 | A | 8/1995 | Deevi et al. |
| 5,456,868 | A | 10/1995 | Lear et al. |
| 5,542,901 | A | 8/1996 | Atwell et al. |
| 5,568,819 | A * | 10/1996 | Gentry et al. ......... 131/342 |
| 5,724,997 | A | 3/1998 | Smith et al. |
| 5,875,824 | A | 3/1999 | Atwell et al. |
| 5,896,861 | A | 4/1999 | Veluz |
| 5,997,691 | A | 12/1999 | Guatam et al. |
| 6,033,506 | A | 3/2000 | Klett |
| 6,257,242 | B1 | 7/2001 | Stavridis et al. |
| 6,537,186 | B1 * | 3/2003 | Veluz ..................... 493/42 |
| 6,565,710 | B2 | 5/2003 | Salow et al. |
| 6,761,174 | B2 | 7/2004 | Jupe et al. |
| 7,784,470 | B2 * | 8/2010 | Paine et al. .......... 131/335 |
| 7,784,471 | B2 * | 8/2010 | Paine et al. .......... 131/335 |
| 2002/0002979 | A1 | 1/2002 | Bowen et al. |
| 2004/0187881 | A1 | 9/2004 | Jupe et al. |

FOREIGN PATENT DOCUMENTS

| | | |
|---|---|---|
| EP | 0 532 329 A2 | 3/1993 |
| EP | 0 608 047 B1 | 7/1994 |
| EP | 1 029 462 | 8/2000 |
| GB | 1 329 956 | 9/1973 |
| GB | 1 383 085 | 2/1975 |
| GB | 2014973 A | 9/1979 |
| JP | 1-127495 | 8/1989 |
| JP | 9-187266 | 7/1997 |
| JP | 10-279986 | 10/1998 |
| JP | 2000-236863 | 9/2000 |
| JP | 2000-246095 | 9/2000 |
| WO | 00/35580 | 6/2000 |
| WO | WO 02069745 A1 * | 9/2002 |

OTHER PUBLICATIONS

MAST Carbon Ltd, "Novacarb Synthetic Carbon: Innovation in Carbon Materials", Mar. 2001, Accesed via Legacy Tobacco Documents Library, Bates record No. 2082361895/1896, http://legacy.library.uscf.edu/tid/zdh92c00, accessed Sep. 20, 2009.*

Jacobson, Alec, "Sphere Packing Lattice Generation," Aug. 16, 2007, http://porlamadrugada.googlepages.com/AlecJacobsonSpherePacking.pdf accessed Sep. 20, 2009.*

Wikipedia contributors, "Close-packing of spheres," Wikipedia, The Free Encyclopedia, http://en.wikipedia.org/w/index.php?title=Close-packing_of_spheres&oldid=311036677 (accessed Sep. 21, 2009).*

J. W. Hassler, "Activated Carbon", Chemical and Process Engineering Sercies, pp. 89-94, 1967.

H. Jankowska et al., "Active Carbon", Ellis Horwood, London, pp. 80-81, 1991.

"What's Happening to Charocal Fitlers?", Tobacco Reporter Magazine, pp. 24-31, Mar. 1968.

Advertisement by Filtrona "Flavour your cigarettes not your machines" from Tobacco Reporter magazine, Feb. 1999.

G. F. Liptrot et al., "Modern Physical Chemistry", pp. 154-168, 1986.

M. Raker et al., "Carbon Action", Tobacco Reporter Magazine, pp. 38-43, Sep. 1996.

J. W. Hassler, "Activated Carbon", Chemical and Process Engineering Series, pp. 61-62, 1967.

Brochure "Ambersorb Carbonaceous Adsorbents", published by Rohm and Haas, 1992.

R. C. Bansal et al., Active Carbon, pp. 23-24, 1991.

H. Jankowska et al., Active Carbon, pp. 29-31, 1991.

P. Jacgard, "Filters favoured as flavour carriers", The Tobacco Industry 1994, 1994.

* cited by examiner

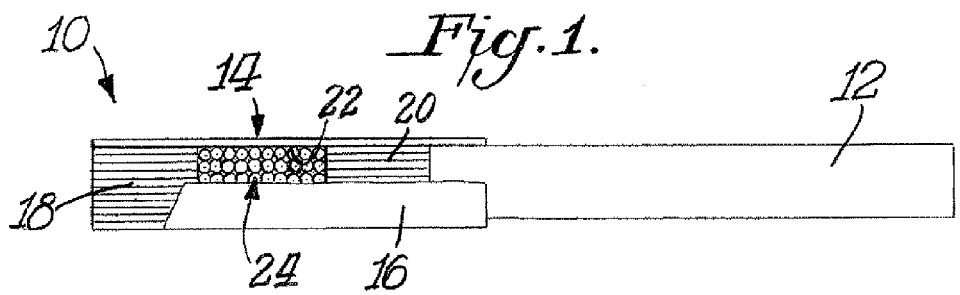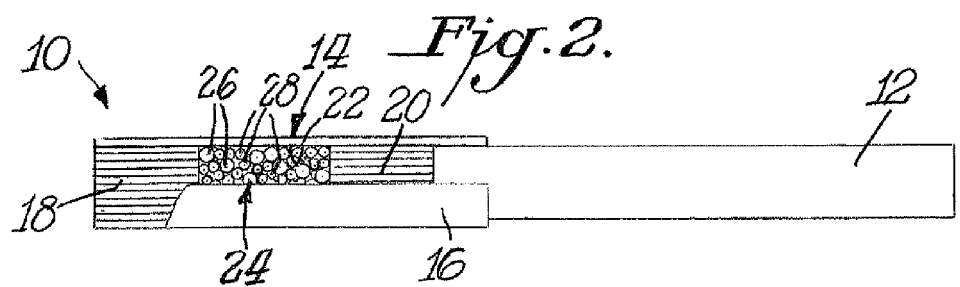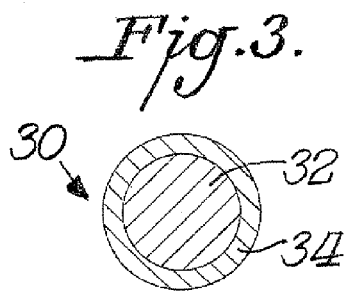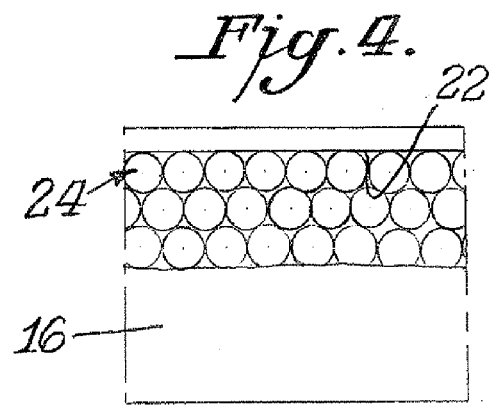

CIGARETTE FILTER WITH BEADED CARBON

CROSS-REFERENCE TO RELATED APPLICATIONS

The present application is a continuation of application Ser. No. 10/339,680, filed Jan. 9, 2003. This application claims the benefit of U.S. Provisional Application 60/347,558 filed Jan. 9, 2002, and U.S. Provisional Application 60/403,490 filed Aug. 14, 2002, which are hereby incorporated herein in their entirety by reference.

FIELD OF THE INVENTION

The present invention relates to filter-tipped smoking articles such as filtered cigarettes, and in particular, to cigarette filters containing a carbon material.

BACKGROUND OF THE INVENTION

Filter-tipped smoking articles, particularly cigarettes, generally comprise a tobacco rod, a filter and a band of tipping paper attaching the filter to tobacco rod. The tobacco rod generally comprises a column of shredded tobacco (e.g., in form of cut filler) that is wrapped within a cigarette paper or wrapper. Typically, the filter includes a plug of fibrous material (a "filter plug"), preferably made of a cellulose acetate tow. Ventilation of mainstream smoke is achieved by provision of a row or rows of perforations through the tipping paper at a location along the filter plug. Ventilation provides dilution of drawn mainstream smoke with ambient air to reduce the delivery level of tar per puff.

During smoking, a smoker draws mainstream smoke from the coal at the lit end of the cigarette. The drawn cigarette smoke first enters the upstream filter portion of the filter and then passes through the downstream portion adjacent to the buccal end of the cigarette filter.

Certain cigarettes have filter segments which incorporate materials such as granules of carbon, silica gel, zeolite and the like. Exemplary cigarettes and filters are described in U.S. Pat. No. 2,881,770 to Tovey; U.S. Pat. No. 3,353,543 to Sproull et al.; U.S. Pat. No. 3,101,723 to Seligman et al.; and U.S. Pat. No. 4,481,958 to Ranier et al. and European Patent Application Nos. 532,329 and 608,047. Certain commercially available filters have particles or granules of carbon (e.g., an activated carbon material) alone or dispersed within a cellulose acetate tow; other commercially available filters have carbon threads dispersed therein; while still other commercially available filters have so-called ☐cavity filter☐ or ☐triple filter☐ designs. Exemplary, commercially available filters include SCS IV Dual Solid Charcoal Filter and Triple Solid Charcoal Filter from Filtrona International, Ltd.; Triple Cavity Filter from Baumgartner; and ACT from Filtrona International, Ltd. See also, Clarke et al., *World Tobacco*, p. 55 (November 1992). Detailed discussion of the properties and composition of cigarettes and filters is found in U.S. Pat. No. 5,404,890 to Gentry et al. and U.S. Pat. No. 5,568,819 to Gentry et al., the disclosures of which are hereby incorporated by reference.

Examples of concentric filter layouts that include granular carbon are disclosed in European Patent Application No. 579,410 and U.S. Pat. No. 3,894,545 to Crellin et al.

The plug-space-plug design typically comprises a pair of spaced-apart filter plugs and a bed of granulated, activated carbon in the cavity or space therebetween. In their manufacture, a procession of spaced-apart filter plugs is established along a continuous ribbon of plug wrap. The plug wrap is then partially folded about a portion of the plug precession and granulated carbon material is poured or otherwise introduced into the spaces defined between the partially enwrapped filter plugs. The plug wrap is then glued and closed, and the resultant continuous rod is then cut in well-defined locations according to a desired length, usually in the form of multiples of the filter element actually utilized on the filter-tipped cigarette itself.

Cavity filling apparatus known in the art may be utilized in the manufacture of filter components such as shown in FIGS. 1 and 2. U.S. Pat. Nos. 4,214,508, 5,221,247, 5,322,459, 5,542,901 and 5,875,824 illustrate and describe such cavity filling apparatus and these disclosures are incorporated herein by reference.

With machines and carbon materials of the prior art, process control usually suffered at high machine speeds from inconsistent metering, scattering and pulverization of the granular material. Consistency amongst filter rods would suffer, and some cavities would be less filled than others.

For example, certain prior "charcoal" metering devices contain a supply of granular carbon in a hopper and allowed the rim of a rotating metering wheel to rotate through the relatively stationary collection of granular carbon. Such an arrangement created a pulverizing action upon the granular carbon, which action generally increased with machine speed. Ricochet and escape of particulate matter during manufacturing operations with prior machines and materials often created unacceptable deficiencies in the final product (such as smears or incomplete fillings) and precipitate undesirable machine "down-times" to effect clean-up of the machine and the surrounding work environment.

Granulated carbon, being a collection of irregularly shaped and variously sized particles, tends to pack into a given volume of space inconsistently from one filling operation to the next. Accordingly, heretofore incomplete and inconsistent filling of cavities would plague automated filter rod making. The irregular packing would also create undesirable channels through the bed that would allow passage of substantial portions of mainstream smoke through or around the bed such that interaction between the mainstream smoke and the granular carbon would be lessened.

It has been known to include granulated, activated carbon materials in cigarette filters to promote removal of constituents from mainstream smoke. As used heretofore in cigarette filters, these granular forms of carbon have been constructed by carbonizing an organic material such as nut shells or a wood material, and "activating" the carbonized material by subjecting it to a heat treatment at approximately 800 to 1000 degrees Celsius with steam or carbon dioxide. The activation treatment of the material results in a porous (honeycomb-like) internal structure and a very large specific surface area, typically in the range of 300 to 2500 square meters per gram as measured by the Brunauer, Emmett & Teller ("BET") method for activated carbon.

However, such granulated, activated carbon materials have surface roughness and shapes which are irregular and inconsistent from granule to granule. These irregularities and inconsistencies of granulated carbon materials create problems in the commercial production of carbon-bearing cigarette filter rods and cigarettes. For example, the irregular shapes exacerbate ricochet of the particles as they are fed through filter rod making machines, which event dirties the product with errant carbon particles, puts dust into the work environment and creates a need for a shut-down to clean the rod making machine and leads to inconsistent and less complete filling of the cavities in the plug-space-plug filter rods.

Granulated, activated carbon materials also are known to have a significant impact on the taste of a cigarette, in that their randomly broad range of pore size distribution tends to capture not only gas phase components of a mainstream tobacco smoke, but also portions of the particulate phase, i.e., some or a great number of tar constituents that contribute taste and flavor to the cigarette smoke. Granular activated carbons that are constructed from nut shells or wood are also known to include impurities, which are believed to be another possible cause of off-tastes attributed to the use of granulated carbon in cigarettes.

It is also understood that the process of activating granular carbon tends to weaken the granule body, such that it is less robust and more prone to fracture, pulverization and dusting when fed through metering devices of filter rod making machines. It is also understood that the activation treatment adds cost to the manufacture of granulated material.

SUMMARY OF THE INVENTION

Accordingly, an object of the present invention is to provide a cigarette having a cigarette filter incorporating a form of carbon capable of efficiently and effectively adsorbing gas phase components present in mainstream cigarette tobacco smoke with a lesser impact on the perceived taste of the cigarette when smoked.

Accordingly, another object of the present invention is to provide a cigarette having a cigarette filter incorporating a form of carbon and/or other materials capable of efficiently and effectively adsorbing gas phase components of mainstream smoke, yet is physically robust to withstand automated filter rod making operations and does not require excessive activation treatment and associated costs thereof.

Yet another object of the present invention is to improve automated production of carbon-bearing filter rods.

Yet another object of the present invention is to promote a more complete and consistent filling of cavities in plug-space-plug filter manufacturing.

Still another object of the present invention is to obviate (lessen) material scatter and ricochet in the manufacture of filter plugs so as to lessen the occurrence of smeared product or dusting and the need to clean filter rod making machinery.

These and other objects are achieved with the present invention in which a filter of a smoking article is constructed of activated carbon beads of consistent spherical form and preferably of a pre-selected diameter, range of pore size distribution and activity level. With the present invention, there is achieved a carbon-bearing cigarette filter that offers uniformity of product formation, uniformity of product performance, ease of achieving uniformity for both of these, and improved absolute performance.

In a preferred embodiment, there is provided a plug-space-plug filter whose cavity is filled with beaded carbon of a consistent spherical shape and preferably of about the same size, preferably in the range of 0.2 to 0.7 millimeter in diameter, more preferably in the range of 0.2 to 0.4 millimeters at or about 0.35 mm diameter. At such sizes, sufficient and effective gas phase removal is achieved at moderate to lower activation levels, which preferably are in the range of 1600 square meters per gram or less (as measured by the Brunauer, Emmett & Teller ("BET") method). Accordingly, the robustness or hardness of the carbon beads is preserved so as to enhance their resistance to fracture and formation of undesirable dust during automated manufacture of filter rods.

Maintaining bead size at or about a preselected diameter promotes a smoother flow and more consistent packing of the beads during manufacturing processes.

Activated beaded carbon is found to have a preponderance (greatest portion) of its pore size distribution in the micropore range (less than 20 angstroms), which is believed to be optimal for the removal of gas phase constituents. It has also been found that activated beaded carbon (particularly pitch-based beaded carbon) has a smaller population of macropores (greater than 500 angstroms) compared to wood or coconut based (granular) activated carbons.

Preferably, the beaded carbon is manufactured to have a pore size distribution predominantly in the range of micropores or small mesopores (50 angstrom diameter or less), with much fewer of the pores in the range of macropores (500 angstroms or greater), with the remainder of the pores lying within the range defined therebetween.

Beaded carbon may also be adapted to carry flavorants in a manner such that they are releasable to mainstream smoke.

BRIEF DESCRIPTION OF THE DRAWINGS

Novel features and advantages of the present invention in addition to those mentioned above will become apparent to persons of ordinary skill in the art from a reading of the following detailed description in conjunction with the accompanying drawings wherein similar referenced characters refer to similar parts and in which:

FIG. 1 is a side elevational view of a cigarette comprising a tobacco rod and a multi-component filter, according to the present invention, with portions thereof broken away to illustrate internal details;

FIG. 2 is a side elevational view similar to FIG. 1, but showing a cavity filled with spherical beaded carbon of two different sizes;

FIG. 3 is a cross sectional view of a single spherical bead optionally comprising a core and a surface coating of flavorant;

FIG. 4 is an enlarged partial cross sectional view of a filter cavity filled with spherical beaded carbon, showing point-to-point contact between the beads;

DETAILED DESCRIPTION OF THE INVENTION

Figure 6:
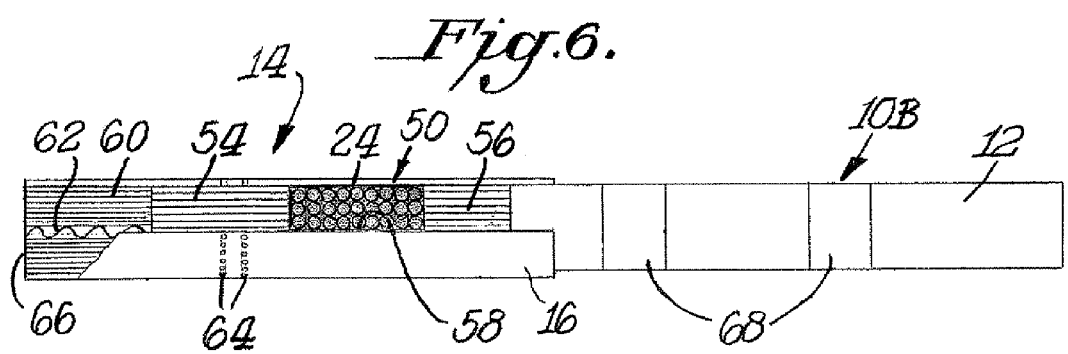
FIG. 6 is a side elevational view of still another embodiment of the present invention comprising a tobacco rod and a multi-component filter with portions thereof broken away to illustrate interior details.

Referring to FIG. 1, a preferred embodiment of the present invention provides a cigarette 10 comprising a tobacco rod 12 and a multi-component filter 14 attached to the rod with tipping paper 16. The filter 14 is in the form of a plug-space-plug design with spaced apart cellulose acetate plugs 18, 20 and a cavity 22 therebetween filled with a beaded carbon 24 of a spherical form. Other filter configurations that include a cavity filled with spherical beaded adsorbent material are also within the scope of the present invention.

The spherical beaded carbon material 24 comprises individual beads preferably of a pre-selected uniform diameter that have the advantageous tendency to contact each other at single points of contact when established as a bed within a cavity of a plug-space-plug cigarette filter. Such single-point contact produces a bed of the carbon material with minimal channeling or short-circuiting of tobacco smoke drawn through the cavity 22. Accordingly, maximum contact is achieved between the gas phase of the cigarette smoke and the carbon surface of the beads for extremely efficient adsorption of the targeted gas phase components.

The filter cavity 22 is preferably filled with spherical carbon beads of the same size or in the alternative, comprise beads having two different sizes, one larger than the other. Smaller size beads pack uniformly between larger beads, as shown in FIG. 2. Specifically, FIG. 2 is a side elevational view similar to FIG. 1 with filter cavity 22 filled with a combination of large beads 26 and smaller beads 28 packed uniformly between the larger beads. The two sizes of beads may be selected mathematically to maximize filing of the cavity 22 and thereby minimize bypass channeling at the outer edges of the cavity. In selecting the maximum bead diameter to be used, the diameter of the cylindrical filter cavity 22 is taken into consideration and optimal performance is achieved by utilizing beads having diameters in the range of 1/10 to 1/40 that of the cavity diameter. When smaller beads 28 are also included in combination with the larger beads 26, the smaller beads generally have a diameter of about 22% that of the larger beads. A preferred mathematical relationship is a ratio of $$\sqrt{\left(\frac{3}{2}\right)} - 1$$

for the radius of the smaller beads 28 relative to the radius of the larger beads 26.

As a further alternative, beaded material may also be selected to provide flavorants to the smoke stream after other filter components have removed much of the gas phase components targeted for removal. In one particular embodiment, the filter component may be similar to the one shown in FIG. 1 with an additional downstream cavity filled with flavored beaded material.

The tendency for single point contact between the spherical beaded carbon 24 minimizes friction between the beads and allows them to flow rapidly during the manufacturing process in a manner similar to liquids so as to self-assemble into a close packed array within filter cavity 22. Such free flowability enables rapid and efficient filling of cavity 22 with little or almost no wasted scatter of the carbon beads.

The carbon materials may be formulated into beaded configurations by techniques known in the art. Moreover, when activated carbon is selected as the spherical beaded carbon material, the carbons disclosed in U.S. Pat. Nos. 4,917,835, 5,456,868 and 6,033,506 may be utilized as well as other carbon formulations known in the art. The disclosures of these patents are incorporated herein by reference. Beaded carbon of a consistent and true spherical form may be obtained from the Kureha Chemical Industry Co., Ltd. of Japan or Mast Carbon Ltd, Henley Park, Guilford GU3 2AF, United Kingdom.

As noted above, spherical beaded carbon material 24 immediately packs into a close-packed array with minimal formation of channels which might otherwise reduce the efficiency of the filter bed within the filter cavity 22. This is a direct result of the point-to-point contact between the smooth surfaced beads of material. Such uniform packing promotes less variation in the filters produced as well as less variation in their overall performance. Unlike granular bed packings which often settle thereby producing formation of bypass channels or other void spaces, filter cavity 22 is substantially completely filled with spherical beaded carbon material during the manufacturing process with no appreciable settling thereafter.

Figure 5:
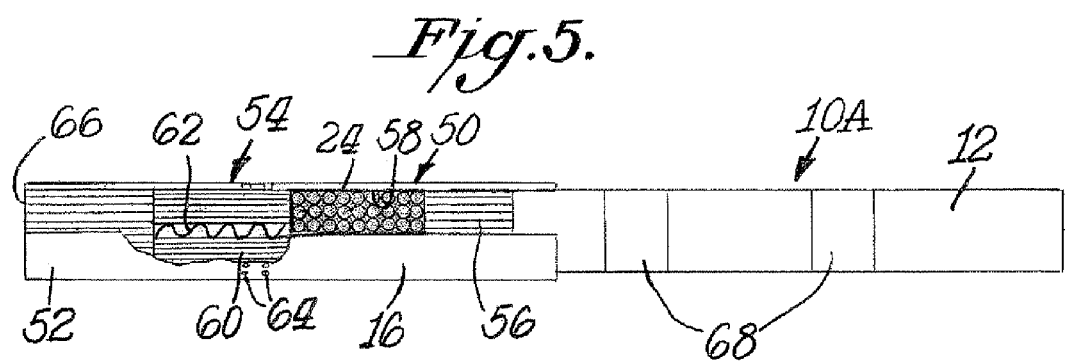
FIG. 5 is a side elevational view of another embodiment of the present invention comprising a tobacco rod and a multi-component filter with portions broken away to illustrate internal details.

Referring to FIG. 5, another preferred embodiment of the present invention provides a cigarette 10A comprising a rod of smokable material 12 such as shredded tobacco and a multi-component filter 14 attached to the rod 12 with a tipping paper 16. Upon lighting of the cigarette 10A, mainstream smoke is generated by and drawn from the tobacco rod 12 and through the filter 14.

Herein, the "upstream" and "downstream" relative positions between filter segments and other features are described in relation to the direction of mainstream smoke as it is drawn from the tobacco rod 12 and through the multi-component filter 14.

Preferably, the filter 14 comprises a first, upstream carbon-bearing segment 50 and a mouth end (mouthpiece) component 52. In this embodiment, the carbon-bearing segment 50 comprises a plug-space-plug filter sub-assembly that includes a central filter component 54, a tobacco end component 56 in spaced apart relation to the central filter component 54 so as to define a cavity 58 therebetween filled with spherical beaded carbon material 24, such as activated beaded carbon. The tobacco end component 56 is located adjacent to the tobacco rod 12 and preferably, comprises a plug of cellulose acetate tow of low resistance to draw ("RTD").

As discussed above, the spherical beaded carbon material 24 comprises individual beads that contact each other at single points. Such single-point contact produces a bed of the carbon material with minimal channeling or short-circuiting of tobacco smoke drawn through the cavity 58. Accordingly, maximum contact is achieved between the gas phase of the cigarette smoke and the carbon surface of the beads for extremely efficient adsorption of the targeted gas phase components.

Moreover, as noted above, the carbon materials may be formulated into beaded configurations by techniques known in the art. When activated carbon is selected as the spherical beaded carbon material, the carbons disclosed in U.S. Pat. Nos. 4,917,835, 5,456,868 and 6,033,506 may be utilized as well as other carbon formulations known in the art. The disclosures of these patents are incorporated herein by reference in their entirety for all useful purposes.

The mouth end (buccal) component 52 is preferably in the form of a cellulose acetate plug or other suitable fibrous or webbed material of moderate to low particulate removal efficiency. Preferably, the particulate removal efficiency is low, with the denier and grand total denier being selected such that the desired total RTD of the multi-component filter 14 is achieved.

Preferably at least some, if not all of the carbon bed 24 is flavor-bearing or otherwise impregnated with a flavor.

Still referring to FIG. 5, the central filter component 54 of the multi-component filter 14 preferably comprises a plug 60 of fibrous filter material, preferably cellulose acetate tow of a moderate to low particulate efficiency and RTD, together with one or more flavor-bearing yarns 62. As mainstream tobacco smoke is drawn through the central filter component 54 and along the yarn 62, flavoring is released into the stream of mainstream smoke. Flavor-thread bearing filter plugs may be obtained from the American Filtrona Company, 8410 Jefferson Davis Highway, Richmond, Va. 23237-1341 and a suitable construction for the central filter component 54 is described in U.S. Pat. No. 4,281,671, which patent is hereby incorporated by reference in its entirety for all useful purposes.

Preferably one or more circumferential rows of perforations 64 are formed through the tipping paper 16 at a location along the central component 54 and downstream of the bed of flavored beaded carbon 20, preferably at the upstream end portion of the central component 54 adjacent to the bed 24. The preferred placement maximizes distance between the buccal end 66 of the cigarette and the perforations 64, which preferably is at least 12 mm (millimeters) or more so that a smoker's lips do not occlude the perforations 64. Preferably, the level of ventilation is in the range of 40 to 60% and more preferably approximately 45 to 55% in a 6 mg FTC tar delivery cigarette.

The beaded carbon bed may comprise at least 70 to 120 mg (milligrams) or greater of carbon in a fully filled condition or 160 to 180 mg or greater of beaded carbon in a 85% filled condition or better in the cavity 58.

By way of example, the length of tobacco rod 12 is preferably 49 mm, and the length of the multi-component filter 14 is preferably 34 mm. The length of the four filter components of cigarette 10A is as follows: the tobacco end component 56 is preferably 6 mm; the length of the beaded carbon bed 24 is preferably 12 mm for carbon loading of 180 mg; the central component 54 is preferably 8 mm; and mouth end component 52 is preferably 8 mm.

Tobacco rod 12 may be wrapped with a conventional cigarette wrapper or banded paper may be used for this purpose. Banded cigarette paper has spaced-apart integrated cellulose bands 68 that encircle the finished tobacco rod of cigarette 10 to modify the mass burn rate of the cigarette so as to reduce risk of igniting a substrate if the cigarette 10A is left smoldering thereon. U.S. Pat. Nos. 5,263,999 and 5,997,691 describe banded cigarette paper, which patents are incorporated herein in their entirety for all useful purposes.

Referring now to FIG. 6 another preferred embodiment provides a modified cigarette 10B with the same filter segments as cigarette 10A of FIG. 6, but with a slightly different mutual arrangement of the segments, and similar reference characters are used to identify similar parts. In cigarette 10B the flavor-releasing yarn element 62 is located in the mouth end component 52 at the buccal (mouth) end of the cigarette 10B, downstream from the flavored beaded carbon bed 24 and spaced therefrom by the central component 54. In this embodiment, a plasticizer such as triacetin may be applied to the flavor yarn 62 to hold the yarn in place within component 52 and prevent the yarn from being draw out of the filter during smoking. Alternatively, the flavor yarn 62 may be braided together to achieve the same result. As in the embodiment of FIG. 5, ventilation 64 is provided at a location along the central filter component 54 adjacent to but downstream of the flavored beaded carbon bed 24.

Activated beaded carbon material for use in the above described cigarette filters may be manufactured by many known bead making procedures such as described in U.S. Pat. Nos. 3,909,449 and 4,045,368, and GB patent 1,383,085, for example, all of which are incorporated herein by reference for all useful purposes. In many instances the starting materials comprise pitch from petroleum and coal processing. Fundamentally, any meltable carbon-bearing substance (or carbon precursor) is sufficient if it can be suspended in a fluid so as to establish a spherical shape and solidified and thereafter carbonized and activated.

There are great advantages in machine operation with beaded carbon over more traditional particulate or granulated carbon (such granulated carbon as manufactured and sold by PICA USA Inc, 432 McCormick Boulevard, Columbus, Ohio 43213-1585). It has been discovered that, with a filter rod making machine set to provide a loading of 180 mg of granular carbon in a 12 mm cavity of a cigarette filter at an average 86% fill level, the rod making machine without adjustment of machine settings and at the same amount of carbon and the same length cavity, beaded carbon on average achieved an approximately 91% fill by volume at satisfactory factory machine speeds, for example 1500 plugs per minute. Furthermore, it was discovered that operation of the beaded machine with beaded carbon produced considerably less dust and that the extraneous carbon collected by the machine was reusable and not fractured as is often the case with granular carbon.

Another aspect of the present invention is the improved taste of a cigarette that includes beaded carbon in the filter instead of granular carbon. As explained more fully below, it has been found that based on 1 to 7 point preference scale, American smokers rated a preference level of a control cigarette with no carbon at a highest level (consistent with their preference for carbon-free filters) and the same smokers rendered a preference level for a granular carbon cigarette at a lower level, but when they smoked the same cigarette model with beaded carbon, their preference level rose to a level intermediate to the other two ratings. Such results evidence a significant enhancement in the liking score with beaded carbon over the granular carbon model.

Activated beaded carbon is found to have a significant portion of its pore size distribution in the micropore and mesopore range (less than 50 angstroms) with a relatively small distribution in the macropore range of greater than 500 angstroms. Not wishing to be bound by theory, it is believed that with the smaller count of macropores, beaded carbon has less tendency to capture elements of tar from mainstream smoke and instead lets flavor components of the smoke pass through the bed of carbon beads. In contrast, granular (PICA) carbon has a large portion of pore size distribution in the macropore size range (a size range at or greater than 500 angstroms), which tends to capture larger particles comprising tar and flavor.

Additionally, granular carbon is constructed from organic materials such as coconut shells, nut shells or wood, and its natural origin is believed to contribute a far higher ash count and presence of various metals and other materials and impurities, which are not found in beaded carbon. This aspect is also believed to contribute to beaded carbon having a favorable subjective impact over granular carbon.

There are three central concerns with respect to machinability and the selection of a carbon material for cigarette filter applications. One concern is the tendency of the rod making machine itself to produce dust during cigarette manufacturing operations. Dust can continue to be a problem in the handling of the products. Another concern is the cost of executing the heat treatment for activating carbon. The greater the burn off, the greater the weight of starting material that is wasted. Additionally, at higher activity levels, as a result of the carbon losing mass and density, the carbon becomes more friable. Furthermore, there are limitations on how short a cavity can be established and filled in plug-space-plug filter rod making operations. Presently, with filter rod making machines, at least approximately 4 to 6 mm of cavity length is preferred. Cavities of lengths less than 4 mm create manufacturing difficulties and are not preferred.

Gas phase removal efficiency is impacted by particle size and bead diameter, the smaller beads being the more efficient.

Additionally, as a general matter, the more a given carbon is activated, the more efficient it is at gas phase removal, however, machinability (dusting factor) and cost of the activation treatment are countervailing considerations as to how much activation is desirable. Balance is struck by reducing bead diameter to a preferred range of bead diameter of approximately 0.2 mm to 0.7 mm, more preferably 0.2 to 0.4 mm, at an activation level equivalent to a specific surface area in the range of 1000 to 1600 square meters per gram BET (as measured by the Brunauer, Emmet & Teller method, hereinafter "$m^2$/g BET"), more preferably in the range of 1100 to 1300 $m^2$/g BET. However, extremely small beads tend to pack so closely in a filter cavity that they impose an extra amount of pressure drop across the cavity to an extent which may not be desired. In some applications such as the preferred embodiments, excessive pressure drop is preferably to be avoided. Accordingly, the more preferred spherical beaded size is approximately 0.35 mm in diameter. The preferred ranges of size also promote proper and clean operation of the filter rod making machine.

The smaller the carbon bead, the more closely packed become the beads, which elevates pressure drop. Accordingly, the tendency toward an ever small bead diameter to capture gas phase removal efficiency is countered by the need to stay within the predetermined boundaries on pressure drop across the filter so as to say within expectations of smokers with respect to resistance to draw (RTD) upon smoking a cigarette.

Figure 7:
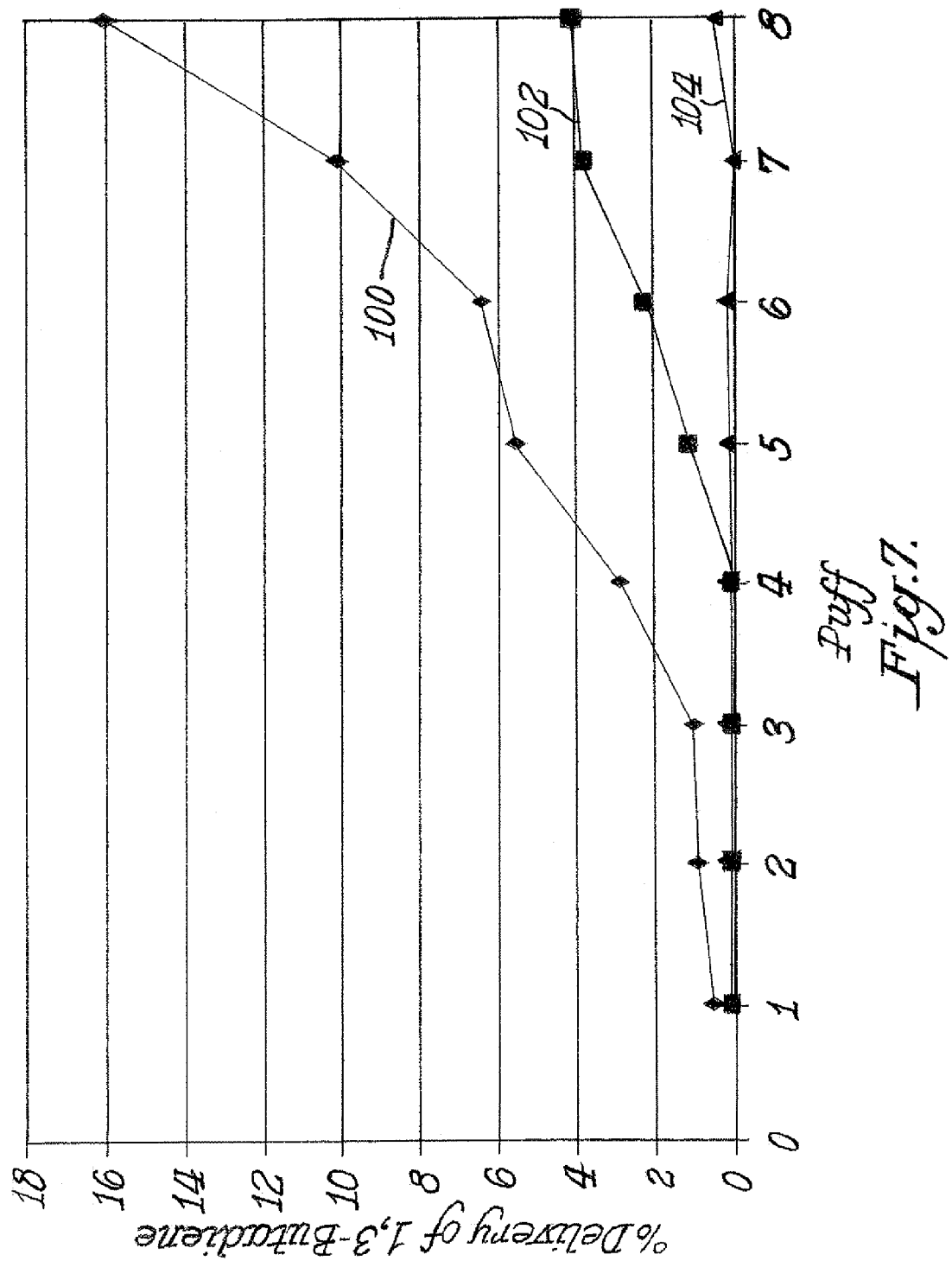
FIG. 7 is a graph of puff-by-puff percent delivery of 1,3-butadiene for several different size beaded carbons.

FIG. 7 is a graphical representation of puff-by-puff delivery of 1,3-butadiene from the mouth end of a cigarette for different carbon bead-size diameters. The given beaded carbon materials comprise 75 mg of 0.7 mm-diameter activated beaded carbon in a 2.7 mm bed length (curve 100 in FIG. 7), 75 mg of 0.5 mm diameter activated beaded carbon in a 2.6 mm bed length (curve 102), and 75 mg of 0.35 mm diameter activated beaded carbon in a 2.5 mm bed length (curve 104). Each cavity was in a completely-filled condition.

Still referring to FIG. 7, it has been found that smaller bead diameter increases performance in the removal of 1,3-butadine, and is fully effective throughout all puffs. In particular, it has been found that 75 mg of beads supplied by the Kureha Chemical Industry Co., Ltd. of Japan at 0.35 mm diameter with a fully filled 2.5 mm cavity length will capture essentially all of the 1,3-butadiene of the cigarette throughout all eight of its puffs, even at relatively low surface area-to-mass values.

The surface area activity level of the beaded material in FIG. 7 is in the range of 1000 to 1600 $m^2$/g BET, preferably, 1100 to 1300 $m^2$/g BET. It should be noted that the result represented by line 104 is an almost complete removal of 1,3 butadiene and that line 102 represents a significant (near 90%) reduction in 1,3 butadiene.

Figure 8:
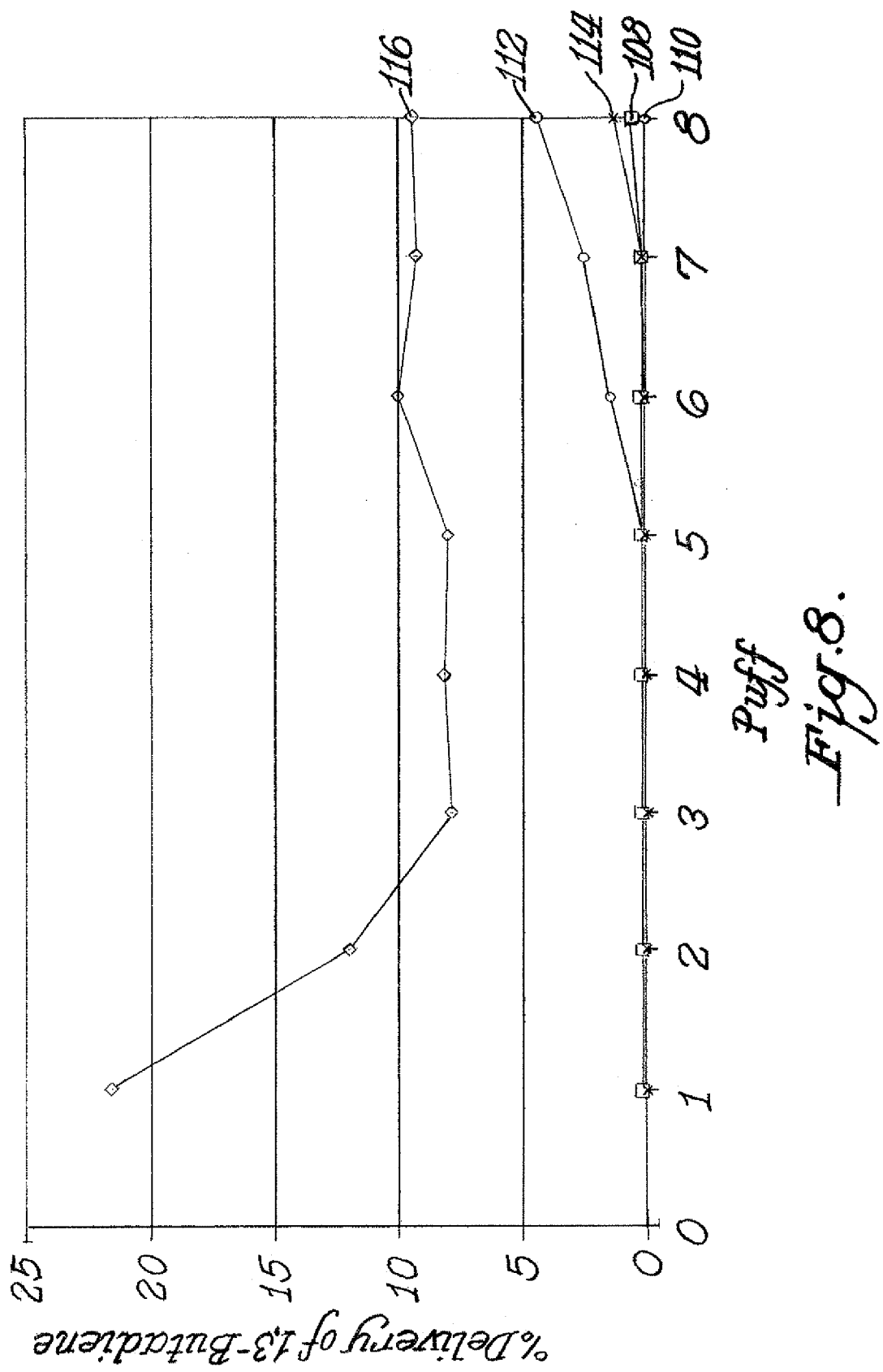
FIG. 8 is a graph of puff-by-puff delivery of 1,3-butadiene as a function of different PICA and beaded carbons, as well as delivery of 1,3-butadiene from the control, a 1R4F standard cigarette.

FIG. 8 is a graphical representation of puff-by-puff delivery from the mouth end of a cigarette of 1,3-butadiene for different diameters of beaded carbon: 75 mg of 0.35 mm diameter carbon beads in a 2.5 mm length cavity (curve 108 in FIG. 8), 48 mg of 40×60 mesh granular (PICA) carbon in a 2.5 mm length cavity (curve 110), 46 mg of 20×50 mesh granular (PICA) carbon in a 2.5 mm length cavity (curve 112), 180 mg of 20×50 mesh granular (PICA) carbon in a 12 mm length cavity (curve 114), and a 1R4F cigarette standard control (curve 116).

Comparing FIGS. 7 and 8 one finds that 40×60 mesh granular carbon with a 48 mg loading in a 2.5 mm cavity (curve 110 in FIG. 8) presents essentially the same result as from a 0.35 mm diameter beaded carbon (curve 108 in FIG. 7). However, the 40×60 mesh PICA carbon is known to be extremely difficult to handle in filter rod making machine operations (significant and confounding dusting). However, 0.35 mm diameter beaded carbon, at a 75 mg loading is readily handled without significant dusting in machine operations both because of the favorable general flow characteristics of beaded carbon and its greater density and hardness, (being at a lower to moderate level of activation). Accordingly, the beaded carbon achieves the same performance as super fine granular (PICA) carbon, yet at a size readily handled by cigarette manufacturing machinery. Such is a significant advantage.

Generally, the carbon beads are denser and harder material than PICA particulate carbon. Accordingly, there is less dusting in manufacturing and handling of cigarette filters with beaded carbon and it tends to fill cavities in more orderly fashion and more completely than granular carbon does.

Figure 9:
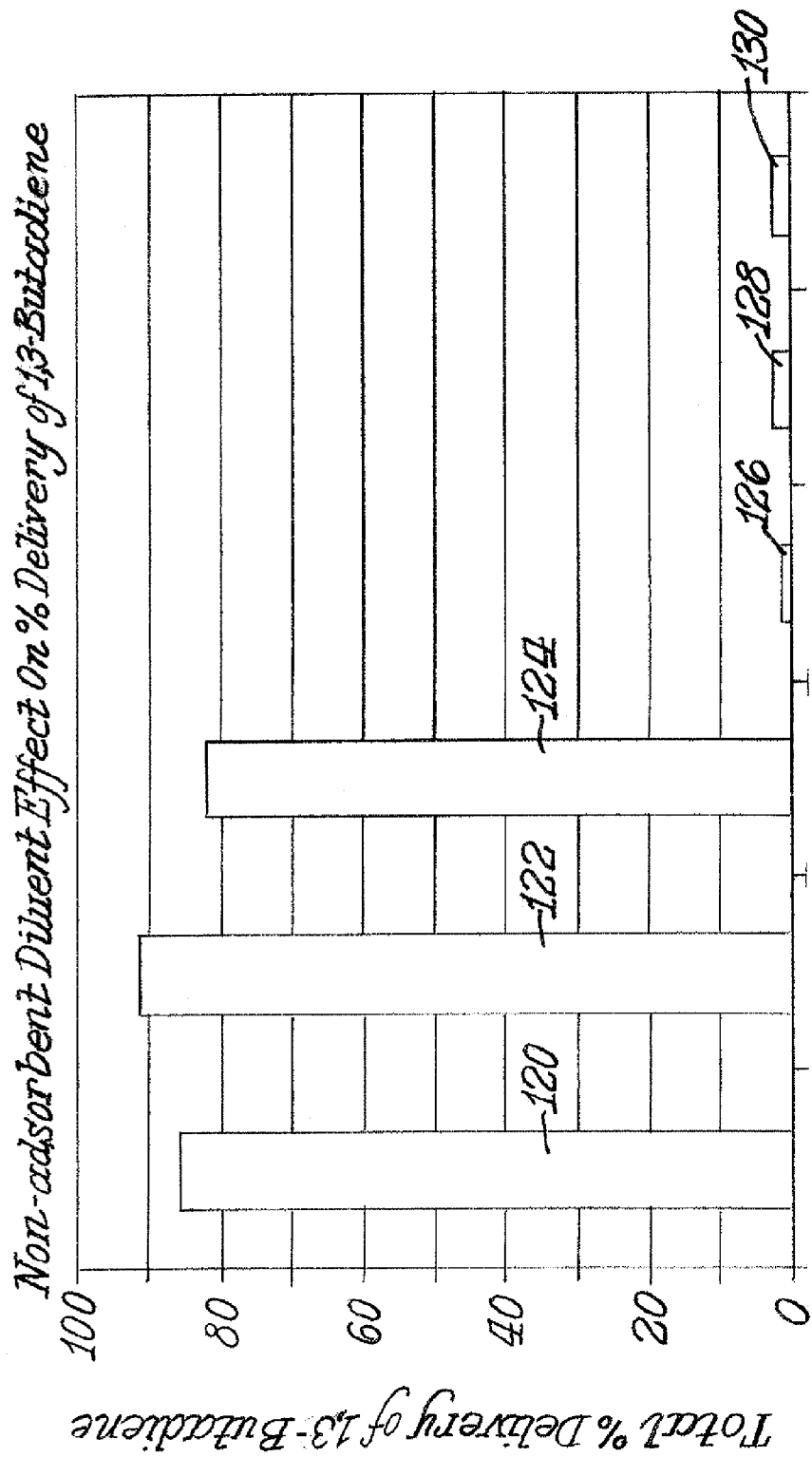
FIG. 9 is a bar graph showing the effect of carbon and non-adsorbent diluents on the percent delivery of 1,3-butadiene.

With 0.35 mm diameter beaded carbon at a 75 mg loading level at a filled cavity condition, excellent gas phase removal efficiency is achieved, such as that represented by line 104 in FIG. 7. However, such carbon loading fully fills a 2.5 mm long cavity at a standard cigarette circumference (24 millimeter), which cavity length is difficult to manufacture. Accordingly, it may be preferred to include with the activated beaded carbon other beads of similar or preferably the same size, but with little or no activity to save costs and to enhance machinability. Experiments combining 75 mg of beaded carbon with glass beads at a volumetric split of ⅓ beaded carbon and ⅔ beaded glass showed essentially the same performance in gas phase removal as with the same 75 mg loading acting by itself. Accordingly, it may be preferred to mix a 75 mg loading of activated beaded carbon with additional beads of unactivated carbon, preferably of the same size in diameter of sufficient mass to fill a 6 mm long cavity or such additional amount that may be required to fill the cavity traditionally employed by the cigarette manufacturer. Such combination of activated and non-activated carbon beads produces the same results at a lesser cost since it is not necessary to entirely fill the cavity with the more expensive activated carbon beads. A further advantage of this discovery is that a cigarette manufacturer can preselect a cavity size for his spectrum of cigarette brands and have a freedom to select different amounts of carbon for different bands or packings and fill any remainder of space in the preselected cavity with inactivated (or less activated) beaded material, beaded material flavor carriers, or other suitable filler material. As smoker preferences change or in response to other circumstances, the proportion of activated beaded carbon in the filter may be changed without complications such as having to change the cavity size in the cigarette layout or size changing the filter and cigarette production machinery. Such is a significant advantage in cigarette operations FIG. 9 is a bar chart that illustrates relatively similar results on the total percent delivery of 1,3-butadine for filters with beaded carbon alone and beaded carbon dispersed with a non-adsorbent diluent. Bar 120 in FIG. 9 is for a 1R4F cigarette standard control and shows about 86% delivery of 1,3-butadiene from the mouth end of the cigarette after about eight puffs during the smoking process. Bar 122 and 124 represent a cigarette construction similar to FIG. 5, but with cellulose acetate and no carbon (bar 122) and 380 mg of glass beads and no carbon (bar 124). After about eight puffs the total percent delivery of 1,3-butadiene from the mouth end of each cigarette is high, approximately 91% for bar 122 and 82% for bar 124. Bars 126, 128 and 130 each represent cigarette constructions similar to FIG. 5, but in each instance the filter cavity is filled with different materials. The cigarette represented by bar 126 includes a cavity filled with 75 mg of 0.35 mm diameter activated carbon beads. Approximately only 1% of delivery of 1,3-butadiene passes through the mouth end of the cigarette of bar 122 after eight puffs, and similar results are achieved with the cigarettes represented by bars 128 and 130 where the filter cavities are filled with 75 mg of 0.35 mm diameter activated carbon beads, but in combination with non-adsorbent diluents. The cigarette of bar 128 includes 190 mg of glass beads dispersed with the carbon beads and the cigarette of bar 130 includes 380 mg of glass beads dispersed with the carbon beads. In each instance the total percent delivery of 1,3-butadiene from the mouth end of the cigarette after eight puffs is about 2%. In summary, filters that include activated carbon beads in combination with non-adsorbent diluents produce approximately the same results as filters with an equivalent weight of activated carbon beads in undiluted form.

The following Table 1 shows pore size distribution of activated carbons including PICA carbon 20×50 mesh per inch and 40×60 mesh per inch as well as beaded carbons having diameters of 0.7 mm, 0.5 mm and 0.35 mm from two different batches.

TABLE 1

| Sample | Bulk Density (g/cc) | BET S.A. ($m^2/g$) | * DFT Pore Volumes Micro Vol. ($cm^3/g$) | Total Vol. ($cm^3/g$) |
|---|---|---|---|---|
| PICA 20 × 50 mesh | 0.37 | 1587 | 0.5459 | 0.5983 |
| PICA 40 × 60 mesh | 0.39 | 1468 | 0.5566 | 0.5967 |
| Beads Batch 1 0.7 mm diameter | 0.57 | 1129 | 0.4614 | 0.4849 |
| Beads Batch 1 0.5 mm diameter | 0.58 | 1247 | 0.4791 | 0.4906 |
| Beads Batch 1 0.35 mm diameter | 0.59 | 1289 | 0.4821 | 0.5154 |
| Beads Batch 2 0.5 mm diameter | 0.58 | 1150 | 0.4562 | 0.4618 |
| Beads Batch 2 0.35 mm diameter | 0.58 | 1244 | 0.4750 | 0.5030 |

* DFT: as calculated by Density Functional Theory which is a molecular-based statistical thermodynamic theory that allows relating the adsorption isotherm to the microscopic properties of the system. (Reference: P. A. Webb and C. Orr, Analytical Methods in Fine Particle Technology, Micromeritics Instrument Corporation, Norcross, GA, 1977, page 81.)

PICA carbon has a bulk density of approximately 0.37 grams per cubic centimeters whereas activated beaded carbon of the preferred carbon has a bulk density greater than 0.5, more preferably in the range of 0.55 to 0.6 $g/cm^3$.

It is to be realized that the beaded, activated carbons of the preferred embodiments may be mixed, combined or otherwise cooperating with other adsorbants such as zeolites, molecular sieves, composite or layered materials, clays, alumina, other metal oxides, metal silicates, and metal phosphates, silica gels, and modified silica gels, such as 3-aminopropylsilyl (APS) silica gel beads.

The following Table 2 shows the percent total delivery of the indicated gas phase components versus a control 1R4F standard cigarette for cigarette filter constructions where a filter cavity such as shown in FIG. 5 is filled with the indicated materials.

TABLE 2

|  | 1R4F: Control | 75 mg of 0.35 mm diameter carbon beads | 75 mg of 0.35 mm diameter carbon beads and 190 mg glass beads (blended) | 75 mg of 0.35 mm diameter carbon beads and 380 mg glass beads (blended) | 380 mg glass beads | 30 mg of 0.35 mm diameter carbon beads and 70 mg silica | 40 mg of 0.35 mm diameter carbon beads and 60 mg silica |
|---|---|---|---|---|---|---|---|
| Carbon Dioxide | 101 | 96 | 99 | 103 | 98 | 90 | 96 |
| Propene | 95 | 18 | 23 | 23 | 80 | 33 | 28 |
| Hydrogen Cyanide | 86 | 7 | 11 | 12 | 57 | 24 | 18 |
| Ethane | 90 | 76 | 78 | 79 | 77 | 72 | 70 |
| Propadiene | 100 | 18 | 34 | 32 | 122 | 47 | 45 |
| 1,3-butadiene | 86 | 1 | 2 | 2 | 82 | 7 | 4 |
| Isoprene | 94 | 3 | 2 | 2 | 97 | 4 | 4 |
| cyclopentadiene | 94 | 3 | 3 | 2 | 59 | 6 | 4 |
| 1,3-cyclohexadiene | 99 | 3 | 1 | 1 | 104 | 4 | 3 |
| me-cyclopentadiene | 87 | 2 | 1 | 1 | 116 | 3 | 2 |
| formaldehyde | 87 | 21 | 18 | 20 | 137 | 15 | 12 |
| acetaldehyde | 95 | 4 | 4 | 5 | 81 | 4 | 3 |
| Acrolein | 102 | 1 | 1 | 2 | 70 | 4 | 2 |
| Acetone | 99 | 1 | 0 | 0 | 86 | 0 | 0 |
| Diacetyl | 84 | 1 | 1 | 0 | 79 | 1 | 0 |
| methyl ethyl ketone | 101 | 1 | 0 | 0 | 98 | 0 | 0 |
| isovaleraldehyde | 84 | 3 | 3 | 2 | 75 | 2 | 2 |
| Benzene | 96 | 2 | 1 | 1 | 96 | 5 | 3 |
| Toluene | 86 | 2 | 1 | 0 | 85 | 2 | 1 |
| isobutyronitrile | 78 | 0 | 0 | 0 | 62 | 0 | 0 |
| methyl furan | 90 | 2 | 2 | 1 | 122 | 6 | 3 |
| 2,5-dimethyl furan | 88 | 3 | 1 | 1 | 180 | 4 | 2 |

TABLE 2-continued

| | | | | | | | |
|---|---|---|---|---|---|---|---|
| hydrogen sulfide | 91 | 13 | 19 | 18 | 51 | 23 | 21 |
| carbonyl sulfide | 89 | 45 | 51 | 51 | 89 | 55 | 53 |
| methyl mercaptan | 93 | 29 | 28 | 31 | 108 | 33 | 33 |
| 1-methyl pyrrole | 90 | 0 | 0 | 0 | 69 | 0 | 0 |
| Ketene | 77 | 2 | 1 | 0 | 89 | 5 | 3 |
| acetylene | 99 | 113 | 113 | 121 | 114 | 94 | 95 |

| | 40 mg of 0.35 mm diameter carbon beads and 60 mg silica (blended) | 50 mg of 0.35 mm diameter carbon beads and 50 mg silica | 46 mg 20 × 50 PICA | 48 mg 40 × 60 PICA | 75 mg of 0.7 mm diameter carbon beads | 75 mg of 0.5 mm diameter carbon beads |
|---|---|---|---|---|---|---|
| Carbon Dioxide | 101 | 117 | 100 | 103 | 108 | 98 |
| Propene | 37 | 26 | 46 | 25 | 59 | 36 |
| Hydrogen Cyanide | 10 | 9 | 11 | 2 | 37 | 17 |
| Ethane | 71 | 88 | 75 | 75 | 89 | 76 |
| Propadiene | 59 | 43 | 80 | 51 | 76 | 43 |
| 1,3-butadiene | 5 | 0 | 8 | 0 | 43 | 11 |
| Isoprene | 3 | 1 | 4 | 0 | 34 | 7 |
| cyclopentadiene | 3 | 2 | 5 | 0 | 39 | 9 |
| 1,3-cyclohexadiene | 1 | 1 | 2 | 0 | 39 | 6 |
| me-cyclopentadiene | 1 | 1 | 2 | 0 | 50 | 5 |
| formaldehyde | 20 | 22 | 11 | 4 | 32 | 20 |
| acetaldehyde | 3 | 2 | 19 | 4 | 37 | 10 |
| Acrolein | 2 | 1 | 3 | 0 | 36 | 8 |
| Acetone | 0 | 0 | 1 | 0 | 22 | 2 |
| Diacetyl | 0 | 0 | 1 | 0 | 15 | 3 |
| methyl ethyl ketone | 0 | 0 | 1 | 0 | 27 | 3 |
| isovaleraldehyde | 2 | 1 | 5 | 3 | 27 | 6 |
| Benzene | 1 | 1 | 2 | 0 | 29 | 5 |
| Toluene | 1 | 0 | 2 | 0 | 23 | 4 |
| isobutryonitrile | 0 | 0 | 1 | 0 | 11 | 2 |
| methyl furan | 2 | 1 | 3 | 0 | 41 | 9 |
| 2,5-dimethyl furan | 1 | 1 | 3 | 0 | 58 | 8 |
| hydrogen sulfide | 20 | 15 | 12 | 1 | 38 | 22 |
| carbonyl sulfide | 64 | 58 | 79 | 70 | 82 | 57 |
| methyl mercaptan | 40 | 37 | 42 | 29 | 77 | 40 |
| 1-methyl pyrrole | 0 | 0 | 0 | 0 | 17 | 1 |
| Ketene | 5 | 2 | 0 | 0 | 19 | 5 |
| acetylene | 108 | 119 | 92 | 102 | 121 | 108 |

Preferably, flavor is added to the carbon beads by spraying flavorant upon a batch of activated carbon in a mixing (tumbling) drum or alternatively in a fluidized bed with nitrogen as the fluidizing agent, wherein flavorant may then be sprayed onto the carbon in the bed. Also, it is within contemplation of the present invention to locate flavorants on other filter components or the bed of carbon beads, standing alone, or any of the above with addition of flavorants being carried along one or more plug wraps and/or the tipping paper.

One skilled in the art will appreciate the present invention can be practiced by other than the described embodiments, which are presented for purposes of illustration and not of limitation. For example, cigarette filters may include beaded carbon entrained within a fibrous mass such as cellulose acetate tow. Also, optionally the spherical beads may each comprise a core and a surface coating of flavorant. The present invention is limited only by the claims that follow.

We claim:

1. A cigarette filter comprising at least a pair of spaced apart solid filter segments, a cavity between the segments with beaded, activated carbon therein, essentially all of the beads having a spherical form and a pre-selected diameter for removing at least one gas phase constituent from mainstream tobacco smoke, wherein the beaded, activated carbon fills at least 85% of the cavity, and a flavor releasing segment downstream from the beaded activated carbon.

2. A cigarette filter as in claim 1, wherein at least a portion of the beaded, activated carbon is flavored.

3. The cigarette filter as in claim 1, wherein the beaded carbon of spherical form has a diameter within the range of approximately 0.20 millimeter to 0.70 millimeter.

4. The cigarette filter as in claim 3, wherein the beaded carbon of spherical form has a diameter in the range of 0.20 millimeter to 0.40 millimeter.

5. The cigarette filter as in claim 4, wherein the beaded carbon of spherical form has a diameter of approximately 0.35 millimeter.

6. The cigarette filter as in claim 3, wherein at least a portion of the beaded carbon material has a specific surface area not greater than 1600 meters squared per gram BET.

7. The cigarette filter as in claim 6, wherein at least a portion of the beaded carbon material has a specific surface area in the range of 1100 to 1300 meters squared per gram BET.

8. The cigarette filter as in claim 3, wherein the activated beaded carbon has a density greater than 0.5 g/cm$^3$.

9. The cigarette filter as in claim 1, wherein the activated beaded carbon is of a predetermined amount sufficient to reduce 1,3-butadiene by approximately 90% or more.

10. The cigarette filter as in claim 9, wherein the predetermined amount is approximately 70 to 180 milligrams of activated beaded carbon.

11. The cigarette filter as in claim 1, including a second beaded material of lesser or no activation when compared to the activated beaded carbon.

12. The cigarette filter as in claim 11, wherein the second beaded material comprises a beaded carbon of substantially the same diameter as the activated beaded carbon.

13. The cigarette filter as in claim 1, wherein the spherical beaded carbon comprises a first group of individual beads of substantially the same diameter and a second group of individual beads of substantially the same diameter but smaller than the diameter of the beads of the first group.

14. The cigarette filter as in claim 13, wherein the spherical beads of the second group have a radius which is approximately $$\sqrt{\left(\frac{3}{2}\right)} - 1$$

that of the radius of the beads of the first group.

* * * * *